United States Patent
Seo

(10) Patent No.: US 9,900,492 B2
(45) Date of Patent: Feb. 20, 2018

(54) IMAGING DEVICE AND PHOTOGRAPHING APPARATUS

(71) Applicant: Samsung Electronics Co., Ltd., Suwon-si, Gyeonggi-do (KR)

(72) Inventor: Hyeong-chan Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/122,362

(22) PCT Filed: Apr. 20, 2015

(86) PCT No.: PCT/KR2015/003926
§ 371 (c)(1),
(2) Date: Aug. 29, 2016

(87) PCT Pub. No.: WO2015/163653
PCT Pub. Date: Oct. 29, 2015

(65) Prior Publication Data
US 2016/0373641 A1 Dec. 22, 2016

(30) Foreign Application Priority Data
Apr. 21, 2014 (KR) .................. 10-2014-0047603

(51) Int. Cl.
*H04N 5/232* (2006.01)
*H04N 5/369* (2011.01)
*G03B 13/36* (2006.01)

(52) U.S. Cl.
CPC ......... *H04N 5/23212* (2013.01); *G03B 13/36* (2013.01); *H04N 5/3696* (2013.01)

(58) Field of Classification Search
None
See application file for complete search history.

(56) References Cited

U.S. PATENT DOCUMENTS

| | | | |
|---|---|---|---|
| 6,704,051 B1 * | 3/2004 | Takahashi | G02B 7/28 348/311 |
| 6,829,008 B1 | 12/2004 | Kondo et al. | |
| 8,319,882 B2 | 11/2012 | Fujii et al. | |
| 8,810,713 B2 | 8/2014 | Matsuo et al. | |
| 8,913,175 B2 | 12/2014 | Nagano et al. | |
| 9,706,145 B2 * | 7/2017 | Ishiwata | H01L 27/14605 |
| 2007/0047939 A1 | 3/2007 | Inoue et al. | |
| 2012/0293706 A1 | 11/2012 | Usui | |
| 2013/0021517 A1 | 1/2013 | Ui et al. | |

(Continued)

FOREIGN PATENT DOCUMENTS

| | | |
|---|---|---|
| JP | 2000-156823 A | 6/2000 |
| JP | 10-2003-107339 | 4/2003 |

(Continued)

*Primary Examiner* — Timothy J Henn
(74) *Attorney, Agent, or Firm* — Jefferson IP Law, LLP

(57) ABSTRACT

An imaging device is provided. The imaging device includes: a plurality of phase difference detecting pixels. The plurality of phase difference detecting pixels are defined as portions of areas of pixels and have light-receiving areas receiving incident light, and widths of the light-receiving areas of the phase difference detecting pixels widen as the phase difference detecting pixels get farther apart from a center of the imaging device in a row direction of the imaging device.

14 Claims, 6 Drawing Sheets

(56) References Cited

U.S. PATENT DOCUMENTS

| | | | |
|---|---|---|---|
| 2013/0021519 A1 | 1/2013 | Hamada | |
| 2013/0088621 A1 | 4/2013 | Hamada | |
| 2015/0009367 A1* | 1/2015 | Kobayashi | G02B 7/34 |
| | | | 348/240.3 |

FOREIGN PATENT DOCUMENTS

| | | |
|---|---|---|
| JP | 2005-106994 A | 4/2005 |
| JP | 10-2012-505422 A | 3/2012 |
| JP | 2013-037296 A | 2/2013 |
| JP | 2013-054256 A | 3/2013 |
| KR | 10-2010-0124717 A | 11/2010 |
| KR | 10-2013-0038035 A | 4/2013 |
| KR | 10-2013-0043095 A | 4/2013 |

* cited by examiner

[Fig. 1]
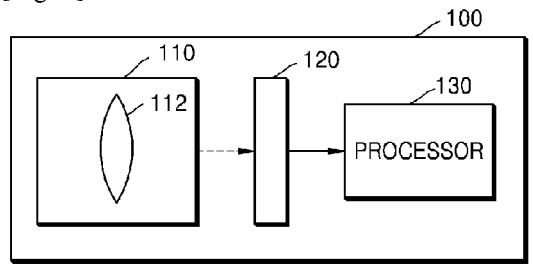
[Fig. 2]
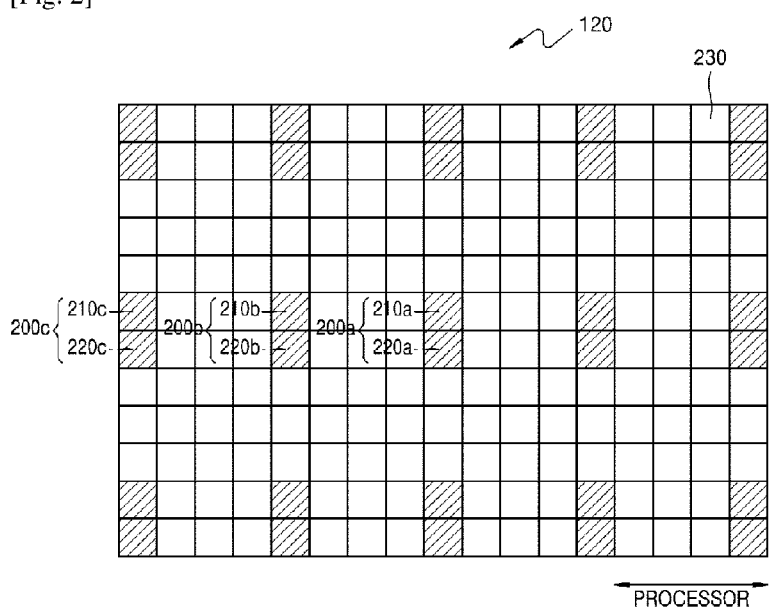
[Fig. 3A]
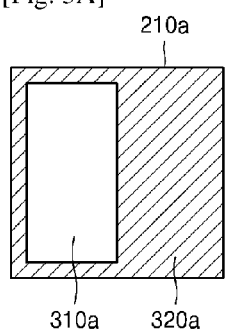 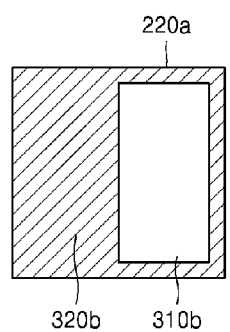
[Fig. 3B]
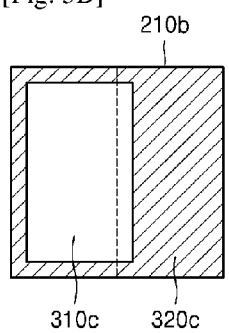 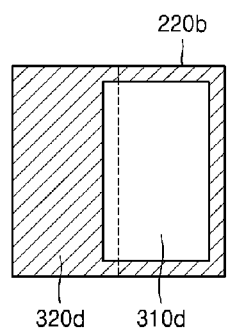

[Fig. 3C]
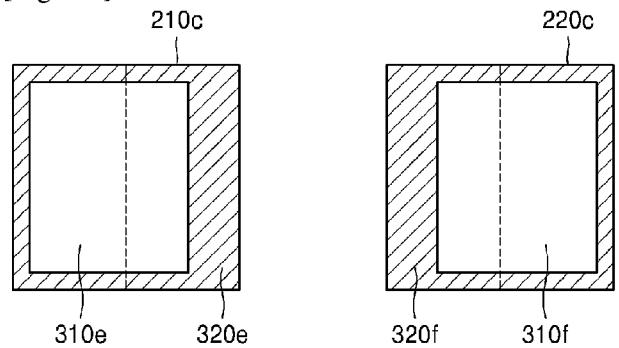
[Fig. 3D]
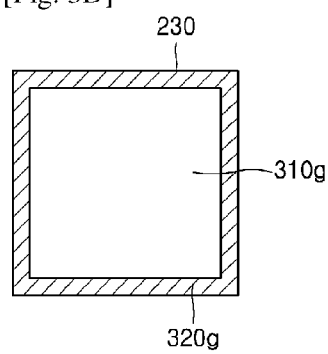
[Fig. 4A]
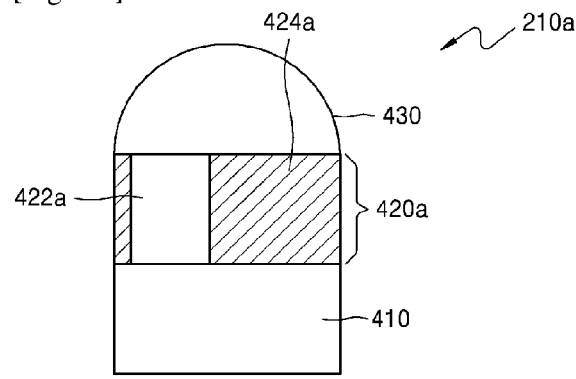
[Fig. 4B]
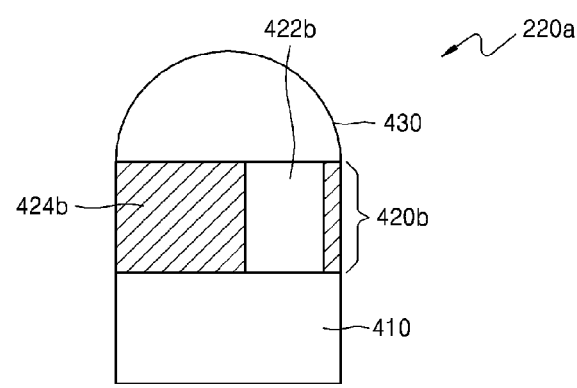

[Fig. 4C]
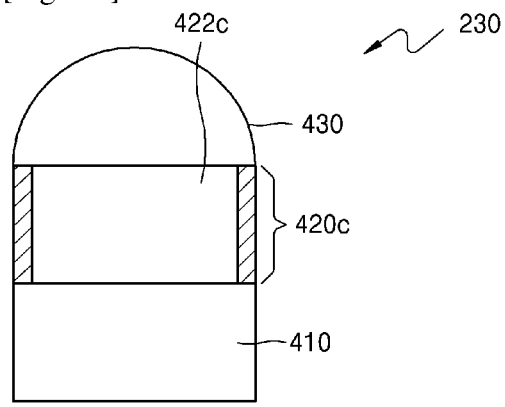
[Fig. 5]
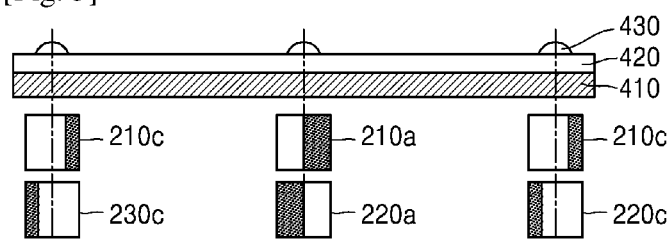
[Fig. 6]
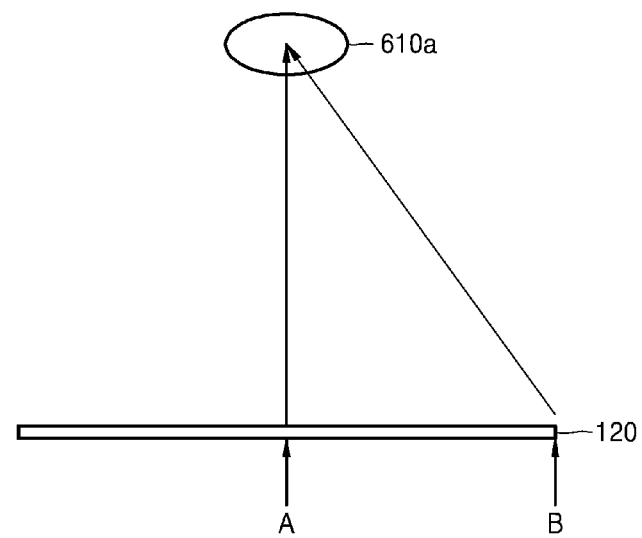

[Fig. 7]
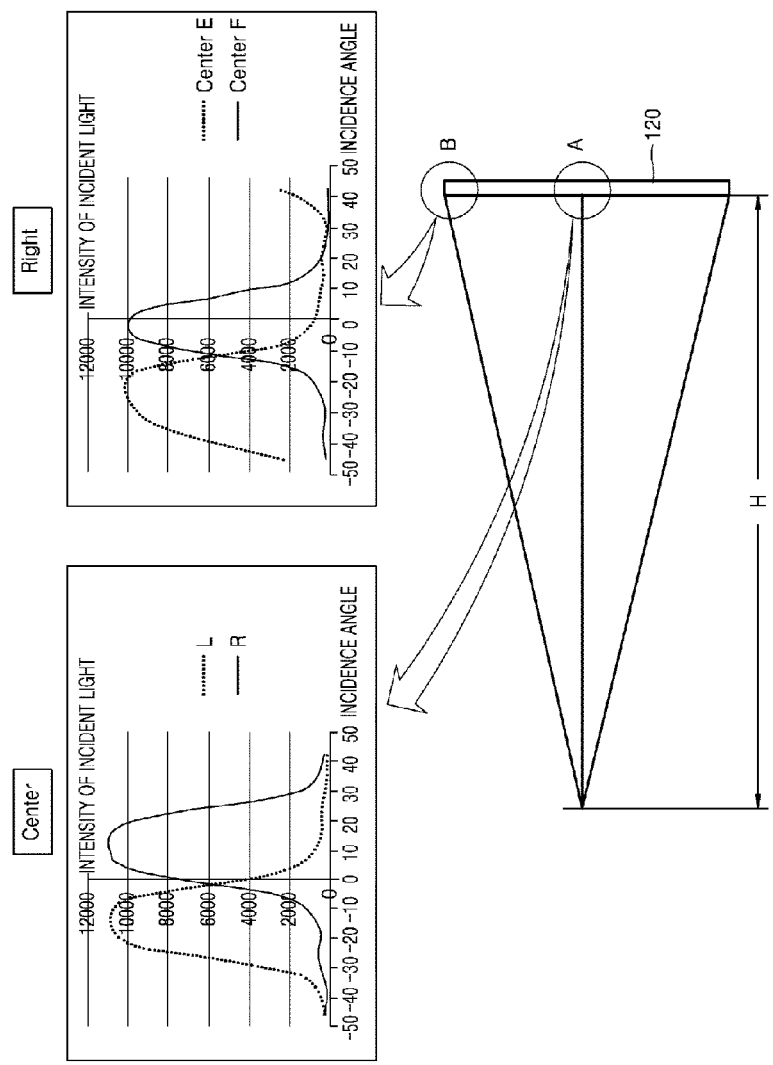
[Fig. 8]
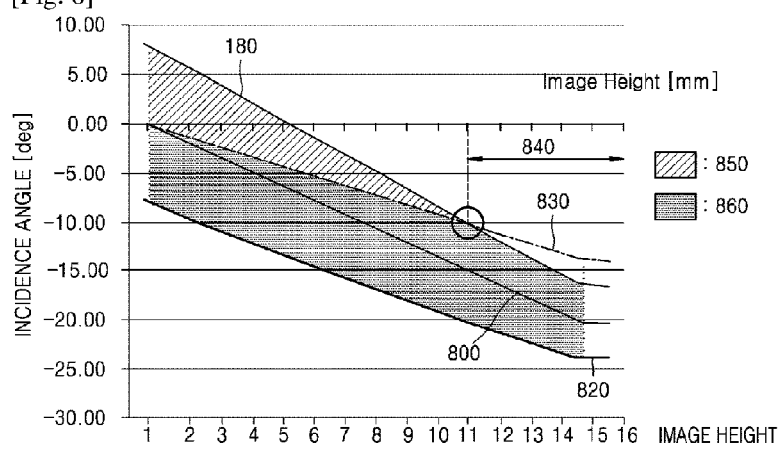

[Fig. 9]
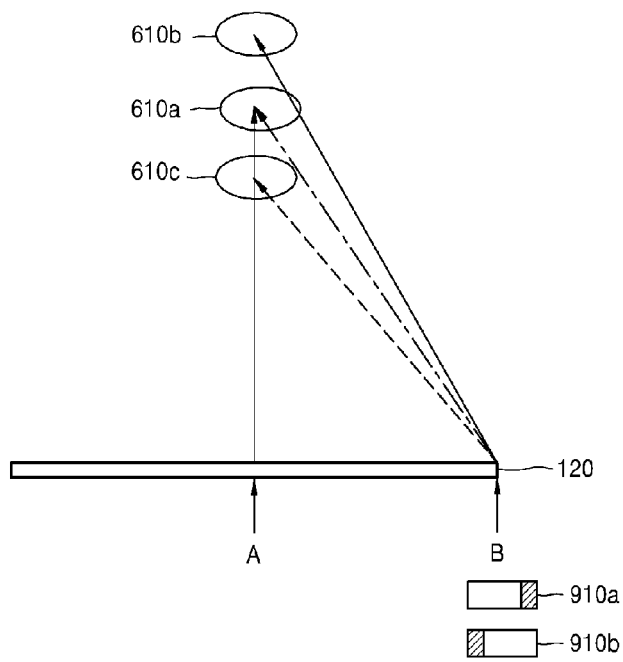
[Fig. 10]
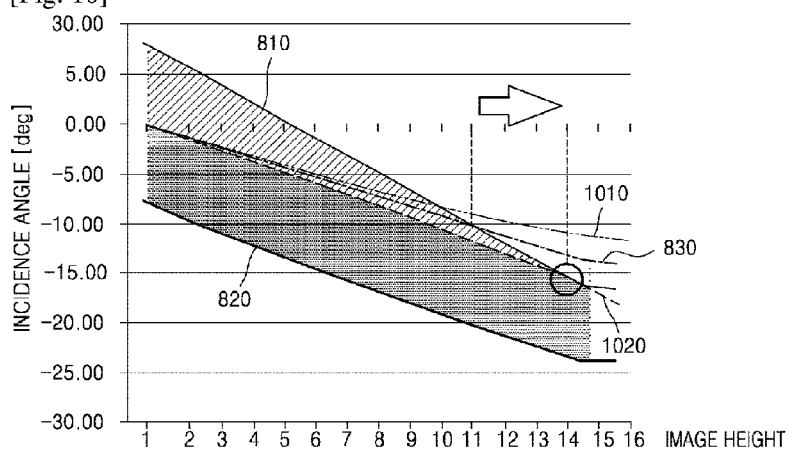
[Fig. 11]
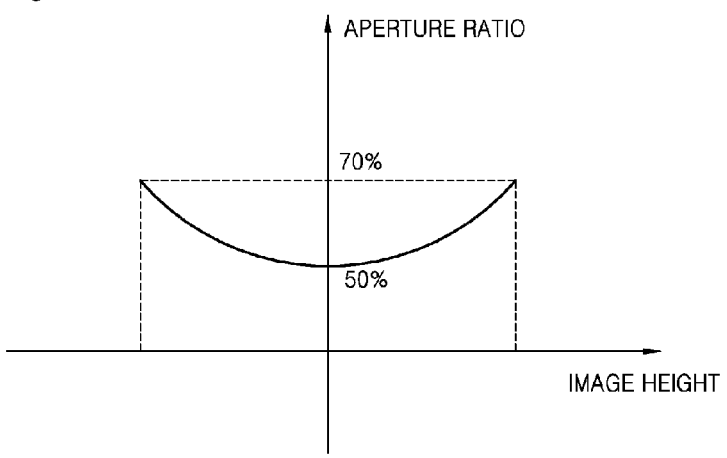

[Fig. 12]
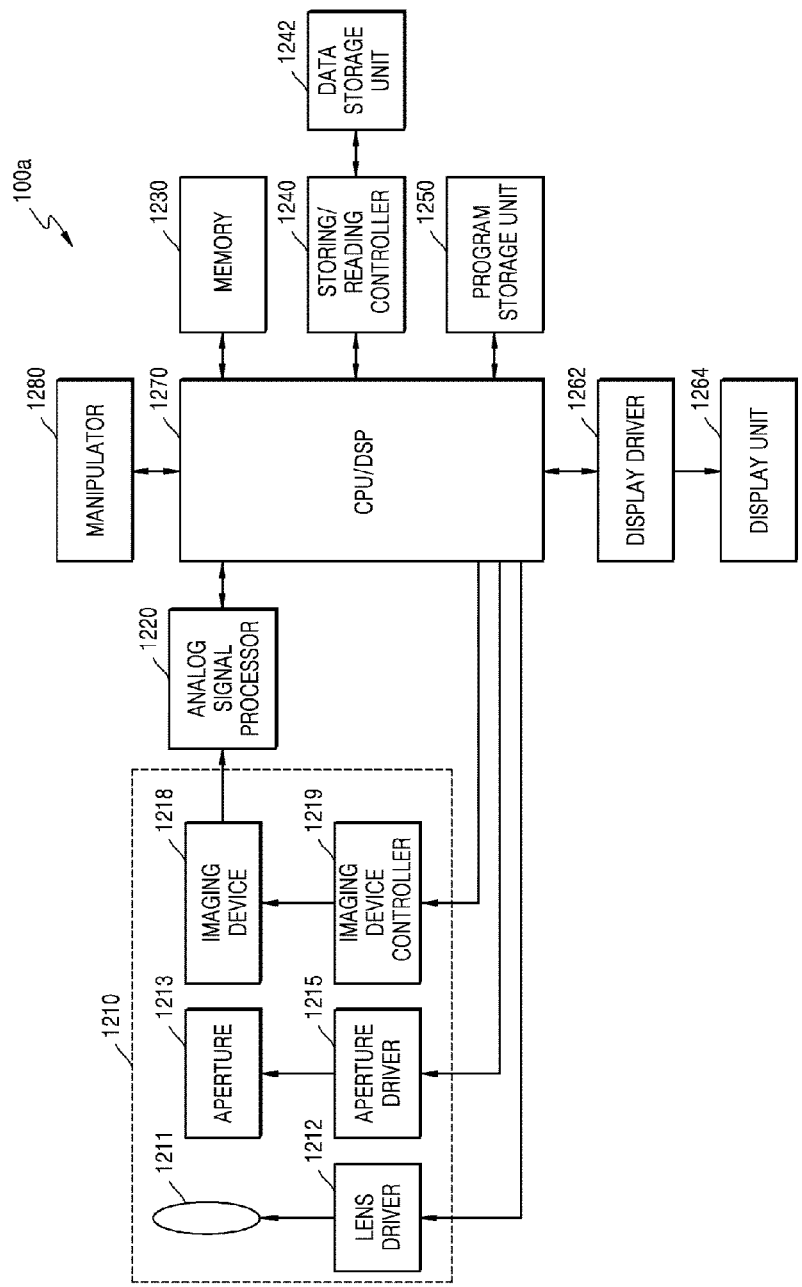

IMAGING DEVICE AND PHOTOGRAPHING APPARATUS

TECHNICAL FIELD

One or more embodiments relate to an imaging device and a photographing apparatus.

BACKGROUND ART

An auto focusing (AF) system is commonly installed in a photographing apparatus such as a digital compact camera, a lens interchangeable camera, a camcorder, or the like. The AF system may be classified into a phase difference detecting type AF system (hereinafter referred to as a phase difference AF system) and a contrast detecting type AF system (hereinafter referred to as a contrast AF system).

The phase difference AF system includes a phase difference AF sensor separately from an imaging device and acquires a defocusing amount of a lens from an output of the phase difference AF sensor to perform AF. The phase difference AF system includes an additional mirror for phase difference AF. For example, besides a main mirror, a sub mirror that guides incident light to the phase difference AF sensor is installed to apply the phase difference AF to a digital single lens reflection (DSLR) camera. The phase difference AF system performs high-speed and high-performance AF but includes an additional optical system for the phase difference AF. Therefore, the phase difference AF system is a high cost system.

The contrast AF system extracts high frequency data from an image data output of the image device and performs AF control to improve the high frequency data.

The contrast AF system includes a signal processing circuit for the high frequency data but does not include an additional sensor or optical system. Therefore, the contrast AF system is relatively inexpensive to manufacture. However, the contrast AF system performs AF at lower speed and precision than the phase difference AF system.

DISCLOSURE OF INVENTION

Solution to Problem

One or more embodiments include an imaging device in which pixels for detecting a phase difference are arranged and an auto focusing (AF) measurement area is widened, and a photographing apparatus.

Additional aspects will be set forth in part in the description which follows and, in part, will be apparent from the description, or may be learned by practice of the presented embodiments.

According to one or more embodiments, an imaging device includes: a plurality of phase difference detecting pixels. The plurality of phase difference detecting pixels may be defined as portions of areas of pixels and have light-receiving areas receiving incident light, and widths of the light-receiving areas of the phase difference detecting pixels may widen as the phase difference detecting pixels get farther apart from a center of the imaging device in a row direction of the imaging device.

The plurality of phase difference detecting pixels may include: a first pixel which has the light-receiving area that is biased and arranged in a first direction defined along the row direction of the imaging device; and a second pixel which has the light-receiving area that is biased and arranged in a second direction opposite to the first direction.

Each of the plurality of phase difference detecting pixels may include: a photodiode layer which photoelectrically converts incident light to generate an electric signal; a mask layer which includes an opening to define the light-receiving area and is formed on the photodiode layer; and a micro lens which focuses the incident light and is formed on the mask layer.

Widths of light-receiving areas of a plurality of phase difference detecting pixels arranged in the center of the imaging device may be 50% of a pixel area.

The widths of the light-receiving areas may increase according to a quadratic function from the center of the imaging device toward an edge of the imaging device.

The imaging device may further include a plurality of image generating pixels which photoelectrically convert incident light to generate image data.

According to one or more embodiments, a photographing apparatus includes: a lens unit; an imaging device which photoelectrically converts incident light to generate an imaging signal and includes a plurality of phase difference detecting pixels and a plurality of image generating pixels; and a processor which uses a phase difference detecting signal generated from the plurality of phase difference detecting pixels and controls the lens unit to perform auto focusing (AF) and generates a capturing image from an image generating signal generated from the plurality of image generating pixels. The plurality of phase difference detecting pixels may be defined as portions of areas of pixels and have light-receiving areas receiving incident light, and widths of the light-receiving areas of the plurality of phase difference detecting pixels may widen as the plurality of phase difference detecting pixels get farther apart from a center of the imaging device in a row direction of the imaging device.

The lens unit may be an interchangeable lens.

The processor may control the lens unit to perform a zooming operation.

The plurality of phase difference detecting pixels may include: a first pixel which has the light-receiving area that is biased and arranged in a first direction defined along a row direction of the imaging device; and a second pixel which has the light-receiving area that is biased and arranged in a second direction opposite to the first direction.

Each of the plurality of phase difference detecting pixels may include: a photodiode layer which photoelectrically converts incident light to generate an electric signal; a mask layer which includes an opening to define the light-receiving area and is formed on the photodiode layer; and a micro lens which focuses the incident light and is formed on the mask layer.

Widths of light-receiving areas of a plurality of phase difference detecting pixels arranged in the center of the imaging device may be 50% of a pixel area.

The widths of the light-receiving areas may increase according to a quadratic function from the center of the imaging device toward an edge of the imaging device.

The photographing apparatus may further include a plurality of image generating pixels which photoelectrically convert incident light to generate image data.

BRIEF DESCRIPTION OF DRAWINGS

FIG. 1 is a view illustrating a structure of a photographing apparatus according to an embodiment;

FIG. 2 is a view illustrating a structure of an imaging device according to an embodiment;

FIG. 3A is a view illustrating an arrangement of a light-receiving area of phase difference detecting pixels arranged in a center of the imaging device, according to an embodiment;

FIG. 3B is a view illustrating an arrangement of a light-receiving area of phase difference detecting pixels arranged in a column emerging from a central column of the imaging device by m (where m is a natural number), according to an embodiment;

FIG. 3C is a view illustrating an arrangement of a light-receiving area of phase difference detecting pixels arranged in a column emerging from a central column of the imaging device by n (where n is a natural number greater than m), according to an embodiment;

FIG. 3D is a view illustrating an arrangement of a light-receiving area of image generating pixels, according to an embodiment;

FIG. 4A is a cross-sectional view of a first pixel, according to an embodiment;

FIG. 4B is a cross-sectional view of a second pixel, according to an embodiment;

FIG. 4C is a cross-sectional view of an image generating pixel, according to an embodiment;

FIG. 5 is a view illustrating a structure of an imaging device according to an embodiment;

FIG. 6 is a view illustrating an imaging device and an exit pupil, according to an embodiment;

FIG. 7 is a view illustrating an intensity of incident light according to an incidence angle in a phase difference detecting pixel if the exit pupil is positioned to be lower than an estimated value, according to an embodiment;

FIG. 8 is a graph illustrating variations in an incidence angle of incident light according to an image height if the exit pupil is set to be lower than a default set position, according to an embodiment;

FIG. 9 is a view illustrating variations in a measurement range, according to an embodiment;

FIG. 10 is a graph illustrating a measurement range that extends according to a phase difference detecting pixel, according to an embodiment;

FIG. 11 is a graph illustrating variations in a size of a light-receiving area, according to an embodiment; and FIG. 12 is a block diagram illustrating a structure of a photographing apparatus, according to an embodiment.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The attached drawings for illustrating embodiments of the present invention are referred to in order to gain a sufficient understanding of the present invention, the merits thereof, and the objectives accomplished by implementation of the present invention. Hereinafter, the present invention will be described in detail by explaining embodiments of the invention with reference to the attached drawings.

The terms used herein will be described in brief, and the present invention will be described in detail.

The terms used herein are general terms that are currently widely used in consideration of functions in the present invention but may vary according to intentions of those of ordinary skill in the art, precedents, appearances of new technologies, or the like. Also, the applicant may arbitrarily select terms in a particular case, and meanings of the terms corresponding to this case will be described in detail in the description of the present invention.

When a part "comprises" an element in the specification, this may mean that the part may not exclude and may further include other elements as long as there is no contrary description. The term "unit" used herein refers to a hardware element such as field-programmable gate array (FPGA) or application-specific integrated circuit (ASIC) and performs any role. However, the term "unit" is not limited to software or hardware. The "unit" may be constituted to be in a storage medium that may be addressed or may be constituted to play one or more processors. Therefore, for example, the "unit" includes elements, such as software elements, object-oriented elements, class elements, and task elements, processes, functions, attributes, procedures, sub routines, segments of a program code, drivers, firmware, a microcode, a circuit, data, a database (DB), data structures, tables, arrays, and parameters.

Hereinafter, embodiments of the present invention will be described in detail with reference to the attached drawings to be easily embodied by those of ordinary skill in the art. Parts that are unrelated to descriptions will be omitted from the drawings to clearly describe the present invention.

FIG. 1 is a view illustrating a structure of a photographing apparatus 100 according to an embodiment.

Referring to FIG. 1, the photographing apparatus 100 includes a lens unit 110, an imaging device 120, and a processor 130.

The lens unit 110 includes at least one lens. The lens unit 110 includes a lens (not shown) and a lens driver (not shown). The lens may include a plurality of lens groups or a plurality of lenses. The lens driver is an element that drives the lens and may include a motor that drives the lens. The lens unit 110 may perform a zooming operation of changing a position of the lens to adjust a wide angle. The lens unit 110 may change the position of the lens to perform an auto focusing (AF) operation.

According to an embodiment, the lens unit 110 may be realized as an interchangeable type. In this case, a main body of the photographing apparatus 100 may be realized as a single lens reflection (SLR) lens interchangeable camera, a mirrorless interchangeable lens camera (MILC), an electronic viewfinder interchangeable lens (EVIL) camera, or a micro/digital interchangeable lens system camera, or the like.

According to another embodiment, the lens unit 110 may be realized as a single body along with the photographing apparatus 100. For example, the photographing apparatus 100 may be realized as a compact camera, a smartphone, a tablet personal computer (PC), a notebook computer, a portable phone, or the like.

According to another embodiment, the photographing apparatus 100 may be combined with removable optical accessories. The removable optical accessories may, for example, include a filter, an external auxiliary lens, a lens hood, a tele-converter, a pin hole, etc.

The imaging device 120 photoelectrically converts incident light to generate an electric imaging signal. The imaging device 120 according to the present embodiment includes a plurality of phase difference detecting pixels and a plurality of image generating pixels.

The processor 130 receives a phase difference detecting signal from the imaging device 120 to perform an AF operation and receives an image generating signal from the imaging device 120 to perform a captured image. The phase difference detecting signal is generated from the plurality of phase difference detecting pixels, and the image generating signal is generated from the plurality of image generating pixels.

The processor 130 may determine whether a focal domain is focused, by using the phase difference detecting signal. The processor 130 may also determine whether the focal domain is in a front pin status, a focusing status, or a back pin status, by using the phase difference detecting signal.

The processor 130 may perform phase difference AF by using a characteristic parameter of the imaging device 120 stored in a memory (not shown). The processor 130 may also calculate a light amount of each of the phase difference detecting pixels according to positions of a pair of phase difference detecting pixels, information about the lens, and the characteristic parameter of the imaging device 120 and detect a focus status by using a signal output from a phase difference detecting pixel having the light amount that is within a preset range FIG. 2 is a view illustrating a structure of the imaging device 120, according to an embodiment.

The imaging device 120 according to the present embodiment includes a plurality of phase difference detecting pixels 200*a*, 200*b*, and 200*c* all over an entire area. A plurality of image generating pixels 230 are arranged in other pixels except pixels in which the plurality of phase difference detecting pixels 200*a*, 200*b*, and 200*c* are arranged.

The plurality of phase difference detecting pixels 200*a*, 200*b*, and 200*c* refer to pixels for detecting a phase difference signal. The phase difference signal may be used by the processor 130 to perform phase difference AF. The plurality of phase difference detecting pixels 200*a*, 200*b*, and 200*c* are a light-receiving area that is defined as a part of a pixel area and receives incident light.

The plurality of phase difference detecting pixels 200*a*, 200*b*, and 200*c* include first pixels 210*a*, 210*b*, and 210*b* having light-receiving areas that are biased and arranged in a first direction defined in a row direction and second pixels 220*a*, 220*b*, and 220*c* having light-receiving areas that are biased and arranged in a second direction opposite to the first direction. For example, the first pixels 210*a*, 210*b*, and 210*c* may have light-receiving areas that are biased and arranged to the left side of the pixels, and the second pixels 220*a*, 220*b*, and 220*c* may have light-receiving areas that are biased and arranged to the right side of the pixels.

The imaging device 120 having a size of 17*12 is illustrated in FIG. 1, but embodiments of the present invention are not limited thereto. The number and arrangement of pixels of the imaging device 120 may vary according to embodiments.

Also, 15 phase difference detecting pixels 200*a*, 200*b*, and 200*c* are arranged in FIG. 2, but embodiments of the present invention are not limited thereto. The number and arrangement of phase difference detecting pixels 200*a*, 200*b*, and 200*c* may vary according to embodiments. In FIG. 2, the phase difference detecting pixels 200*a*, 200*b*, and 200*c* are uniformly arranged all over the entire area of the imaging device 120.

According to another embodiment, densities of the phase difference detecting pixels 200*a*, 200*b*, and 200*c* may vary according to areas. For example, the phase difference detecting pixels 200*a*, 200*b*, and 200*c* are more concentrated in a center of the imaging device 120, and the densities of the phase difference detecting pixels 200*a*, 200*b*, and 200*c* may be reduced toward an edge of the imaging device 120.

FIG. 3A is a view illustrating an arrangement of light-receiving areas of the phase difference detecting pixels 200*a* arranged in a central column of the imaging device 120, according to an embodiment. FIG. 3B is a view illustrating an arrangement of light-receiving areas of the phase difference detecting pixels 200*b* arranged in a column emerging from the central column of the imaging device 120 by m (where m is a natural number), according to an embodiment. FIG. 3C is a view illustrating an arrangement of light-receiving areas of the phase difference detecting pixels 200*c* arranged in a column emerging from the central column of the imaging device 120 by n (where n is a natural number greater than m), according to an embodiment.

As shown in FIGS. 3A through 3C, the plurality of phase difference detecting pixels 200*a*, 200*b*, and 200*c* include first pixels 210*a*, 210*b*, and 210*c* having light-receiving areas 310*a*, 320*c*, and 310*e* that are biased and arranged in a first direction defined in a row direction of the imaging device 120 and second pixels 220*a*, 220*b*, and 220*c* having light-receiving areas 310*b*, 310*d*, and 310*f* that are biased and arranged in a second direction opposite to the first direction. The first pixels 210*a*, 210*b*, and 210*c* and the second pixels 220*a*, 220*b*, and 220*c* are respectively paired with each other and are adjacent to each other in a column direction in FIG. 2, but embodiments of the present invention are not limited thereto. According to another embodiment, the first pixels 210*a*, 210*b*, and 210*c*, and the second pixels 220*a*, 220*b*, and 220*c* may be arranged to be adjacent to each other in a row direction or may be arranged in upper and lower parts or in left and right parts within one pixel.

The light-receiving areas 310*a* through 310*f* and light-shielding areas 320*a* through 320*f* may be determined by patterns of a mask layer of the imaging device 120.

According to an embodiment, as shown in FIGS. 3A through 3C, widths of the light-receiving areas 310*a* through 310*f* may widen from the central column of the imaging device 120 to the edge of the imaging device 120. Here, widths of the light-receiving areas 310*a*, 310*c*, and 310*e* that are included in the first pixels 210*a*, 210*b*, and 210*c*, and biased and arranged to the left side may extend and widen to the right side. The light-receiving areas 310*b*, 310*d*, and 310*f* that are included in the second pixels 220*a*, 220*b*, and 220*c*, and are biased and arranged to the right side may extend and widen to the left side.

FIG. 3D is a view illustrating an arrangement of a light-receiving area 310*g* of image generating pixels 230, according to an embodiment.

The image generating pixels 230 have the light-receiving area 310*g* that occupies most of a pixel area. According to an embodiment, a light-shielding area 320*g* may be arranged at an edge of the pixel area to prevent interference between pixels.

FIG. 4A is a cross-sectional view of a first pixel 210*a* according to an embodiment of the present invention. FIG. 4B is a cross-sectional view of a second pixel 220*a* according to an embodiment of the present invention. FIG. 4C is a cross-sectional view of an image generating pixel 230 according to an embodiment of the present invention.

A plurality of phase difference detecting pixels 200*a*, 200*b*, and 200*c* and a plurality of image generating pixels 230 respectively include photodiode layers 410, mask layers 420*a*, 420*b*, and 420*c*, and micro lenses 430.

The photodiode layer 410 converts an optical signal into an electric signal through a photoelectricity phenomenon. An intensity of the electric signal varies according to an intensity of the optical signal.

The mask layers 420a, 420b, and 420c block incident light incident onto the photodiode layers 410 and define light-receiving areas of respective pixels. The mask layers 420a, 420b, and 420c have openings 422a, 422b, and 422c corresponding to the light-receiving areas, and shielding areas are shielded by mask layer patterns 424a, 424b, and 424c.

The micro lenses 430 focus the incident light and transmit the focused light to the photodiode layers 410. The micro lenses 430 may be formed in pixel units and may be realized to face a preset exit pupil.

FIG. 5 is a view illustrating a structure of the imaging device 120, according to an embodiment.

The imaging device 120 according to the present embodiment includes a photodiode layer 410, a mask layer 420, and a micro lens 430.

The photodiode layer 410 may be formed in a form of continuously formed layers.

The mask layer 420 may be formed in a patterned layer form according to a light-receiving area of each pixel.

The micro lens 430 may be included as a single unit in each pixel and may be formed to face a preset exit pupil. According to another embodiment, the micro lens 430 may be continuously formed in a plurality of pixels.

As shown in FIG. 5, widths of light-receiving areas of a plurality of phase difference detecting pixels 210a, 210c, 220a, and 220c may widen from a central column of the imaging device 120 toward an edge of the imaging device 120.

FIG. 6 is a view illustrating the imaging device 120 and an exit pupil 610a, according to an embodiment.

When incident light is incident from the photographing apparatus 100 into the imaging device 120, the incident light is incident through a virtual area referred to as the exit pupil 610a. As shown in FIG. 6, the exit pupil 610a is defined as a preset area on the imaging device 120 and determined by statuses of a lens and an aperture. Since the exit pupil 610a is determined by a complex element such as a type of the lens, a structure of the lens, an arrangement of the lens, a zoom position, the aperture, or the like, a position and a size of the exit pupil 610 may vary by driving of the lens and the aperture.

An intensity of incident light may vary according to an imaging height in pixels of the imaging device 120. The image height refers to a distance from an optical center. The imaging device 120 may be frequently arranged so that the optical center corresponds to a center of the imaging device 120. Therefore, if the image height is 0, the imaging height refers to the center of the imaging device 120. As the image height increases, the image height is close to the edge of the imaging device 120.

As the image height increases, a designer of the photographing apparatus 100 designs the micro lens 430 to focus incident light onto pixels of the photographing apparatus 120 in order to correct a situation in which it is impossible to measure a phase difference detecting signal. For this, the designer of the photographing apparatus 100 may consider a structure of an optical system of the photographing apparatus 100 to determine an area in which the exit pupil 610a will be arranged and design the micro lens 430 of each pixel to allow the incident light to be incident onto the pixels of the imaging device 120 through the exit pupil 610a. The micro lens 430 may be constituted to allow the incident light incident from the exit pupil 610a to be focused onto each pixel. As the micro lens 430 is constituted to face the exit pupil 610a as described above, the incident light may be uniformly incident onto pixels having different image heights.

However, when the photographing apparatus 100 is used, an arrangement of a lens may vary according to a zooming operation, a focusing operation, an auto focusing operation, an aperture driving operation, or the like. Therefore, a position or a size of the exit pupil 610a may vary. Also, if an interchangeable lens is used, the position and the size of the exit pupil 610 may vary according to a type of a lens installed in the photographing apparatus 100.

FIG. 7 is a view illustrating an intensity of incident light according to an incidence angle in a phase difference detecting pixel if the exit pupil 610a is positioned to be lower than an estimated value, according to an embodiment.

First and second pixels of a phase difference detecting pixel positioned in a center A of the imaging device 120 may have intensity tendencies of incident light according to incident angles as shown on a center graph of FIG. 7. For example, the first pixel having a light-receiving area that is biased and arranged to the left side has an intensity tendency of incident light according to an incident angle as shown by a dotted line L in the center graph. Also, the second pixel having a light-receiving area that is biased and arranged to the right side has an intensity tendency of the incident light according to an incident angle as shown by a solid line R in the center graph. As shown on the center graph, the phase difference detecting pixel may detect incident light having an incident angle within a preset range from an incidence angle of 0° at which incident light is perpendicularly incident, to measure a phase difference detecting signal.

However, if an exit pupil is positioned to be lower than a default set position, first and second pixels of a phase difference detecting pixel positioned on a right side B of the imaging device 120 in FIG. 6 may have intensity tendencies of incident light according to incidence angles as shown on a right graph of FIG. 7. For example, the first pixel having a light-receiving area biased and arranged to the left side has an intensity tendency of the incident light according to an incidence angle as shown on L graph. Also, the second pixel having a light-receiving area that is biased and arranged to the right side has an intensity tendency of the incident light according to an incidence angle as shown on R graph. As shown on the right graph, due to a movement of the exit pupil, a range of an incidence angle that may be measured in the first and second pixels is moved to a minus incidence angle, and thus, it is almost impossible to detect incident light having a plus incidence angle. As described above, due to the movement of the exit pupil, a measurement range of the phase difference detecting signal may be very limited.

FIG. 8 is a graph illustrating variations in an incidence angle of incident light according to an imaging height if an exit pupil is set to be lower than a default set position, according to an embodiment. As shown on the graph of FIG. 8, when an image height increased from the center A of the imaging device 120 toward the right side B of the imaging device 120 in FIG. 6, the incidence angle varies.

A size of an incidence angle that may be measured in phase difference detecting pixels is determined by graphs denoted by reference numerals 810 and 820 of FIG. 8. In other words, an area between the graphs 810 and 820 is a size of a measurable incidence angle. Here, the graph 810 is determined by phase difference detecting pixels having light-receiving areas that are biased to the right side, and the graph 820 is determined by phase difference detecting pixels having light-receiving areas that are biased to the left side.

As described above, the designer of the imaging device 120 designs a micro lens to allow pixels to face the exit pupil 610a. Therefore, a center graph 800 that indicates an incidence angle of incident light from a center of an exit pupil in each pixel is parallel with the graphs 810 and 820 that indicate a threshold value of incidence angles that may be measured in phase difference detecting pixels. In FIG. 8, an area under the center graph 800 is mainly measured by a first pixel having a light-receiving area that is biased and arranged to the left side, and an area after the center graph 800 is mainly measured by a second pixel having a light-receiving area that is biased and arranged to the right side.

However, if an exit pupil is set to be different from a default set position, a graph of an incident angle from a center of the exit pupil varies, and thus a range of an imaging height in which a phase difference detecting signal may be measured is reduced. For example, if the exit pupil is set to be lower than the default set position, the center graph 800 is moved as denoted by a graph 830.

However, as shown in FIG. 8, as the center graph 800 is moved to the graph 830, an area 840 in which the new center graph 830 emerges from a center area between the graphs 810 and 820 is formed. If the center graph 830 indicating a variation in a size of an incidence angle emerges from the center area between the graphs 810 and 820 as described above, it is impossible to measure a phase difference detecting signal. In particular, this phenomenon becomes a problem at an edge of the imaging device 120. In this case, an area that is measured by a second pixel having a light-receiving area biased to the right side is reduced to an area 850. Therefore, it is impossible to measure a second pixel in the area 840, and a measurement range of the second pixel is reduced. Also, an intensity of a phase difference detecting signal detected in the second pixel is reduced, and thus an accuracy of AF is reduced.

FIG. 9 is a view illustrating variations in a measurement range according to an embodiment.

According to an embodiment, as shown in FIG. 9, light-receiving areas of first and second pixels are made wider than a center at an edge of the imaging device 120 to increase a measurement range of a phase difference detecting pixel. As the light-receiving areas of the first and second pixels widen at the edge of the imaging device 120, an exit pupil is differently felt at the first and second pixels at the edge of the imaging device 120. As shown in FIG. 9, as a width of a light-receiving area of a first pixel 910a that is biased and arranged to the right side of the imaging device 120 and has the light receiving area biased and arranged to the left side increases, an exit pupil 610b higher than an exit pupil 610a that is originally set is seen. Also, as a width of a light-receiving area of a second pixel 910b that is biased and arranged to the right side of the imaging device 120 and has the light-receiving area biased and arranged to the right side increases, an exit pupil 610 lower than the exit pupil 610a is seen.

FIG. 10 is a graph illustrating a measurement range that extends according to a phase difference detecting pixel, according to an embodiment.

As described with reference to FIG. 9, as a seen position of an exit pupil varies according to extensions of light-receiving areas of first and second pixels at an edge of the imaging device 120, center graphs of the first and second pixels are respectively changed. For example, the center graph of the first pixel having the light-receiving area biased and arranged to the left side is changed from 830 to 1010, and a center graph of the second pixel having the light-receiving area biased and arranged to the right side is changed from 830 to 1020. Therefore, a measurement range of the second pixel increases to an area between the graphs 1020 and 810 to increase a measurement range of the pixel and increase an intensity of a phase difference detecting signal of the second pixel. Also, a measurement range of the first pixel increases to an area between the graphs 1010 and 820 to increase an intensity of a phase difference detecting signal of the first pixel. Therefore, a measurement range of the phase difference detecting pixel increases, and an accuracy of AF increases.

According to embodiments of the present invention, although measurement efficiency is reduced by a manufacturing error such as a misalignment between a micro lens and a mask occurring when manufacturing the imaging device 120, an impossibility of measuring the phase difference detecting signal may be prevented. If the micro lens misaligns with the mask when manufacturing the imaging device 120, an intensity of incident light incident onto each phase difference detecting pixel may be reduced, and the phase difference detecting pixel may not be measured. This phenomenon becomes more of a problem at an edge area at which the intensity of the incident light is weak. According to embodiments of the present invention, as a size of a light-receiving area increases toward the edge of the imaging device 120, a measurement area increases, and an intensity of a phase detecting signal increases in phase difference detecting pixels at the edge. Therefore, according to embodiments of the present invention, although a manufacturing error occurs when manufacturing the imaging device 120, the phase difference detecting pixel may be measured.

FIG. 11 is a graph illustrating variations in a size of a light-receiving area according to an embodiment.

A light-receiving area of each pixel may be expressed as an aperture ratio of a mask. As the aperture ratio of the mask is great, the light-receiving area is great. As the aperture ratio is small, the light-receiving area is small. According to an embodiment, as shown in FIG. 11, as an imaging height that is a center column of the imaging device 120 increases in a quadratic function form based on point 0, the aperture ratio may increase. Also, according to an embodiment of the present invention, the aperture ration may be 50% at a point at which the imaging height as the center column of the imaging device 120 is 0 and may increase to 70% toward the edge of the imaging device 120.

FIG. 12 is a block diagram illustrating a structure of a photographing apparatus 100, according to an embodiment.

Referring to FIG. 12, the photographing apparatus 100a includes a capturing unit 1210, an analog signal processor 1220, a memory 1230, a storing/reading controller 1240, a data storage unit 1242, a program storage unit 1250, a display driver 1262, a display unit 1264, a central processing unit (CPU)/digital signal processor (DSP) 1270, and manipulator 1280.

An overall operation of the photographing apparatus 100a is controlled by the CPU/DSP 1270. The CPU/DSP 1270 provides control signals for operations of elements to a lens driver 1212, an aperture driver 1215, an imaging device controller 1219, etc.

The capturing unit 1210 is an element that generates an image of an electric signal from incident light and includes a lens 1211, the lens driver 1212, an aperture 1213, the aperture driver 1215, an imaging device 1218, and the imaging device controller 1219.

The lens 1211 may include a plurality of lens groups or a plurality of lenses. A position of the lens 1211 is controlled by the lens driver 1212. The lens driver 1212 adjusts the position of the lens 1211 according to a control signal provided from the CPU/DSP 1270.

Opening and closing degrees of the aperture 1213 are adjusted by the aperture driver 1215, and the aperture 1213 controls an amount of light incident into the imaging device 1218.

An optical signal that passes through the lens 1211 and the aperture 1213 forms an image of a subject on a light-receiving surface of the imaging device 1218. The imaging device 1218 may be a charge-coupled device (CCD) image sensor or a complementary metal oxide semiconductor image sensor (CIS) that converts an optical signal into an electric signal. Sensitivity, etc. of the imaging device 1218 may be adjusted by the imaging device controller 1219. The imaging device controller 1219 may control the imaging device 1218 according to a control signal that is automatically generated by an image signal input in real time or a control signal that is manually input by a manipulation of a user.

An exposure time of the imaging device 1218 is adjusted by a shutter (not shown). The shutter is classified into a mechanical shutter that moves a cover to adjust an incidence of light and an electronic shutter that provides an electric signal to the imaging device 1218 to control exposure.

The analog signal processor 1220 performs noise reduction processing, gain adjusting, waveform regularizing, analog-to-digital conversion processing, etc. on an analog signal provided from the imaging device 1218.

A signal that is processed by the analog signal processor 1220 may be input into the CPU/DSP 1270 through the memory 1230 or may be input into the CPU/DSP 1270 without passing through the memory 1230. Here, the memory 1230 operates as a main memory of the photographing apparatus 100a and temporarily stores information necessary for an operation of the CPU/DSP 1270. The program storage unit 1230 stores an operating system (OS) that drives the photographing apparatus 100a and programs of the OS, etc.

Also, the photographing apparatus 100a includes the display unit 1264 to display an operation status thereof or image information captured by the photographing apparatus 100a. The display unit 1264 may provide visible information and/or acoustic information to the user. The display unit 1264 may include a liquid crystal display (LCD) panel, a light-emitting display panel, or the like to provide the visible information. The display unit 1264 may also be a touch screen that recognizes a touch input.

The display driver 1262 provides a driving signal to the display unit 1264.

The CPU/DSP 1270 processes an input image signal and controls elements according to the input image signal or an external input signal. The CPU/DSP 1270 reduces noises from input image data and may perform image signal processing for image-quality improvement, such as gamma correction, color filter array interpolation, color matrix, color correction, color enhancement, or the like, on the input image data. The CPU/DSP 1270 may compress the image data that is generated by performing the image signal process for the image-quality improvement to generate an image file or recover image data from the image file. A compression format of an image may be a reversible format or an irreversible format. A Joint Photographic Experts Group (JPEG) format or a JPEG 2000 format may be used as an appropriate format to convert a still image. Also, if a moving picture is recorded, a plurality of frames may be compressed to generate a moving picture file according to a Moving Picture Experts Group (MPET) standard. The image file may be generated according to an Inter-changeable image file format (Exif) standard.

Image data that is output from the CPU/DSP 1270 is input into the storing/reading controller 1240 through the memory 1230 or directly, and the storing/reading controller 1240 stores the image data in the data storage unit 1242 according to a signal input from the user or automatically. The storing/reading controller 1240 may also read data about an image from the image file stored in the data storage unit 1242 and input the data into the display driver 1262 through the memory 1230 or another path to display an image on the display unit 1264. The data storage unit 1242 may be removable from the photographing apparatus 100a or may be permanently installed in the photographing apparatus 100a.

The CPU/DSP 1270 may also perform, blur processing, color processing, edge enhancement processing, image analysis processing, image recognition processing, image impact processing, or the like. The CPU/DSP 1270 may perform face recognition, scene recognition, or the like through the image recognition processing. The CPU/DSP 1270 may also perform signal processing on a display image that is to be displayed on the display unit 1264. For example, the CPU/DSP 1270 may perform luminance level adjustment, color correction, contrast adjustment, contour enhancement adjustment, screen division processing, character image generating, image synthesis processing, or the like. The CPU/DSP 1270 may be connected to an external monitor to process a preset image signal in order to display the preset image signal on the external monitor. The CPU/DSP 1270 may also transmit the processed image data to display a corresponding image on the external monitor.

The CPU/DSP 1270 may execute a program stored in the program storage unit 1230 or include an additional module to generate a control signal for controlling auto focusing, zoom changing, focus changing, auto exposure correction, etc. The CPU/DSP 1270 may provide the control signal to the aperture driver 1215, the lens driver 1212, and the imaging device controller 1219 and control operations of elements of the imaging apparatus 100a such as a shutter, strobe, etc.

The manipulator 1280 is an element into which the user may input a control signal. The manipulator 1280 may include various types of functional buttons such as a shutter-release button, a power button, a zoom button, a mode selection button, other capturing value adjusting buttons, etc. The shutter-release button inputs a shutter-release signal for exposing the imaging device 1218 light to take a photograph. The power button inputs a control signal for controlling power on and/or off, and the zoom button widens or narrows a view angle. The manipulator 1280 may be realized as any type through which the user may input a control signal, such as a button, a keyboard, a touch pad, a touch screen, a remote controller, or the like.

The lens unit 110 of FIG. 1 may correspond to the lens 1211 and the lens driver 1212 of FIG. 12. The processor 130 of FIG. 1 may correspond to the CPU/DSP 1270 of FIG. 12.

The photographing apparatus 100a of FIG. 12 is only an embodiment of the present invention, and thus the photographing apparatus 100a according to embodiments of the present invention is not limited to the photographing apparatus 100a of FIG. 12.

As described above, according to the one or more of the above embodiments of the present invention, phase difference detecting pixels may be arranged in an imaging device, and an AF measurement area may widen.

The present invention may be also be embodied as computer readable codes on a computer readable recording medium. The computer readable recording medium is any data storage device that can store data which can be thereafter read by a computer system.

When the computer-readable codes are read from the computer-readable storage medium and executed by a processor, the computer-readable codes perform operations of a method of controlling a photographing apparatus. Also, functional programs, codes, and code segments for accomplishing the present invention may be easily construed by programmers of ordinary skill in the art to which the present invention pertains.

Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. An imaging device comprising:
 a plurality of phase difference detecting pixels,
 wherein the plurality of phase difference detecting pixels have sub-pixel portions, each sub-pixel portion having a light-receiving area receiving incident light, and
 wherein widths of light-receiving areas of the phase difference detecting pixels widen as the phase difference detecting pixels get farther apart from a center of the imaging device in a row direction of the imaging device.

2. The imaging device of claim 1, wherein the plurality of phase difference detecting pixels comprise:
 a first pixel which has the light-receiving area that is biased and arranged in a first direction defined along the row direction of the imaging device; and
 a second pixel which has the light-receiving area that is biased and arranged in a second direction opposite to the first direction.

3. The imaging device of claim 1, wherein each of the plurality of phase difference detecting pixels comprises:
 a photodiode layer which photoelectrically converts incident light to generate an electric signal;
 a mask layer which comprises an opening to define the light-receiving area and is formed on the photodiode layer; and
 a micro lens which focuses the incident light and is formed on the mask layer.

4. The imaging device of claim 1, wherein widths of light-receiving areas of a plurality of phase difference detecting pixels arranged in the center of the imaging device are 50% of a pixel area.

5. The imaging device of claim 4, wherein the widths of the light-receiving areas increase according to a quadratic function from the center of the imaging device toward an edge of the imaging device.

6. The imaging device of claim 1, further comprising:
 a plurality of image generating pixels which photoelectrically convert incident light to generate image data.

7. A photographing apparatus comprising:
 a lens unit;
 an imaging device which photoelectrically converts incident light to generate an imaging signal and comprises a plurality of phase difference detecting pixels and a plurality of image generating pixels; and
 a processor which uses a phase difference detecting signal generated from the plurality of phase difference detecting pixels and controls the lens unit to perform auto focusing (AF) and generates a capturing image from an image generating signal generated from the plurality of image generating pixels,
 wherein the plurality of phase difference detecting pixels have sub-pixel portions, each sub-pixel portion having a light-receiving area receiving incident light, and
 wherein widths of light-receiving areas of the plurality of phase difference detecting pixels widen as the plurality of phase difference detecting pixels get farther apart from a center of the imaging device in a row direction of the imaging device.

8. The photographing apparatus of claim 7, wherein the lens unit is an interchangeable lens.

9. The photographing apparatus of claim 7, wherein the processor controls the lens unit to perform a zooming operation.

10. The photographing apparatus of claim 7, wherein the plurality of phase difference detecting pixels comprise:
 a first pixel which has the light-receiving area that is biased and arranged in a first direction defined along a row direction of the imaging device; and
 a second pixel which has the light-receiving area that is biased and arranged in a second direction opposite to the first direction.

11. The photographing apparatus of claim 7, wherein each of the plurality of phase difference detecting pixels comprises:
 a photodiode layer which photoelectrically converts incident light to generate an electric signal;
 a mask layer which comprises an opening to define the light-receiving area and is formed on the photodiode layer; and
 a micro lens which focuses the incident light and is formed on the mask layer.

12. The photographing apparatus of claim 7, wherein widths of light-receiving areas of a plurality of phase difference detecting pixels arranged in the center of the imaging device are 50% of a pixel area.

13. The photographing apparatus of claim 12, wherein the widths of the light-receiving areas increase according to a quadratic function from the center of the imaging device toward an edge of the imaging device.

14. The photographing apparatus of claim 7, further comprising:
 a plurality of image generating pixels which photoelectrically convert incident light to generate image data.

* * * * *